Patented Apr. 14, 1953

2,635,094

UNITED STATES PATENT OFFICE 2,635,094

PREPARATION OF PROTEINACEOUS SOYBEAN MATERIAL USING ISOPROPANOL

Paul A. Belter, Pekin, Allan K. Smith, Harold J. Deobald, and Philip A. Singer, Peoria, Ill., and Arthur C. Beckel, deceased, late of Peoria, Ill., by Elmer F. Gury, administrator, Peoria, Ill., assignors to the United States of America as represented by the Secretary of Agriculture No Drawing. Application May 16, 1950, Serial No. 162,381

1 Claim. (Cl. 260—123.5)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to methods for preparing a proteinaceous product from soybeans. More particularly, the invention relates to producing a gelable material from soybeans from which the oil has been extracted.

In the production of soybean oil soybeans are usually cracked and passed through flaking rolls and the flaked beans are then extracted with an oil solvent, such as hexane, petroleum ether, or other light hydrocarbon, alkanols, trichlorethylene and the like. The residual material comprises protein, fiber, and a minor proportion of various natural constituents of the original bean. Depending upon the oil solvent used, the particular constitution of the residual material varies considerably as to the minor components.

In application Serial No. 782,941, now Patent No. 2,495,706 filed October 29, 1947, by De Voss, Beckel and Belter, a process is described by which soybean residual material is freed from alcohol solubles and subsequently extracted with water. The water extraction separates a proteinaceous material, aqueous dispersions of which are capable of forming irreversible gels when heated. The proteinaceous content of the solids ranges from 50 percent to 60 percent. In application Serial No. 68,442, filed December 31, 1948, by Beckel and Belter, there is described the use of such proteinaceous soybean material as a remoistening adhesive. In application Serial No. 85,712, filed April 5, 1949, by Beckel, Cowan and Belter, now Patent No. 2,600,388, issued June 16, 1952, the heat-sealing properties of the material are described.

This invention has among its objects a process whereby soybean residual material from oil extraction processes may be treated continuously to remove the alcohol solubles efficiently and at low cost. Still another object is to provide a process whereby hexane-extracted or petroleum ether-extracted soybean flakes may be washed with isopropanol to prepare them for subsequent aqueous extraction to produce gelable material and, to provide a process having certain advantages compared with the similar process using ethanol as described and claimed in copending application Serial No. 161,482 filed May 11, 1950 by Belter, Beckel and Smith.

It has been discovered that soybean material from which the oil has been extracted, may be washed or extracted by means of isopropanol to remove antigelling constituents and, that, moreover, the miscella from the washing or extracting may be subjected to a simple treatment for removing the extractable material therefrom, and subsequently returned continuously to extract fresh soybean material. This step of operation in general is based upon our discovery that the constituents removed by washing or extracting with isopropanol have reduced solubility in isopropanol at reduced temperature. Separation is accomplished by cooling the miscella to 20° C. or lower to effect precipitation of insoluble material and subsequently removing the precipitated material.

Since the cooling step does not effect removal of absolutely all extracted material there is a certain build-up of alcohol solubles in the recycling solvent. We have discovered that these built-up materials never reach a deleterious concentration since the recycling solvent at final equilibrium conditions is still an efficient extraction agency for removing antigelling constituents. The final equilibrium is reached when the amount of built-up solubles is deposited on the wet flakes in the drier at a rate equal to their removal from the flakes in the extractor.

The soybean material utilized in this process, in particular hexane-extracted flakes, should be produced by flaking and oil extracting processes that avoid excessive temperatures. If, especially during the crushing or flaking operations, excessive temperatures are encountered, there is danger of heat denaturing the protein. It is important that this be avoided since denaturation of the protein will not produce satisfactory gelling material.

In general, for the washing step isopropanol may be used within the range of 50 percent aqueous solutions up to absolute, and 70 to 90 percent solutions are preferred. In a continuous process the solvent to flake ratio is preferably within the range of 5 to 1:1 on a weight basis although greater or less ratios may be employed. The temperature of extraction may vary from room temperature up to 85° C., preferably 5° to 10° C. above room temperature, and the time of contact ranges from 15 minutes to 1 hour. At several degrees above room temperature and higher the antigelling constituents are readily soluble in isopropanol and no particular difficulty is experienced in agitation, contact times, etc. Consequently, the extraction may be carried out either concurrently or countercurrently, and only enough agitation to insure contact of each flake with the solvent for a substantial period of time. In general, when operating at preferred temperatures we employ a temperature differential of 10° C. or more between extraction and cooling of the extract, but, of course, the extracting temperatures should be confined to the range of 25° to 85° C. and the cooling temperatures to the range of 20° C. and lower.

For practical reasons it is preferred to carry out the extraction countercurrently. After extraction the flakes are conveyed to a drier where the residual solvent is recovered and any non-volatile constituent still held in solution by the solvent is deposited on the flakes. The extract is pumped to a cooler where it is cooled to room temperature or below and allowed to settle or otherwise subjected to separatory treatment for removing the precipitated material. It may then be recirculated to the extractor preferably after having been brought to the temperature prevailing therein.

The water extract product obtained from isopropanol-washed flakes forms gels in substantially the same manner as that obtainable using ethanol or methanol, and its adhesive properties closely resemble those of the ethanol product. Although the isopropanol product exhibits differences in some properties, it nevertheless possesses certain important advantages. For example, it may be produced at considerably less cost due to the favorable price differential of isopropanol over ethanol. Furthermore, all inconveniences involved in governmental alcohol tax regulations are avoided. These advantages accruing from the use of isopropanol are all the more important since those practical properties of adhesiveness, which it possesses in excellent degree, are of great economic significance. The following specific example illustrates the invention. Parts are by weight unless otherwise specified.

Example

An extraction apparatus was employed consisting of an extraction chamber having provision for feeding flakes and solvent. The flake feed consisted of an endless screen conveyor disposed so as to pass through a zone of counterflowing solvent. The rate of feeding and time of contact with solvent could be controlled by varying the speed of the conveyor and by adjusting the level of the solvent in the extraction zone. The rate of solvent entering the extraction zone was controlled by a variable speed pump.

Isopropanol (90 percent) and flakes were fed to the apparatus in the ratio of 2 to 1 by weight. The apparatus was adjusted to provide a contact time of 15 minutes, and the temperature of the extraction was held at 30° C. The extract, or miscella, leaving the extractor, was cooled to approximately 4° C., allowed to settle and the supernatant solvent recycled. After the first complete cycle the solvent emerging from the extractor was again cooled and separated from precipitated solids in the same manner as before and recycled a second time. The run was continued until the total solubles concentration in the recirculated isopropanol solvent had become constant. Fresh make-up isopropanol was added periodically to compensate for process losses and to replace the solvent entrained by the wet flakes leaving the extractor. During the recycle period, samples or flakes emerging from the extractor were tested periodically and found capable of producing the gelable material by extraction with water.

The spray dried aqueous extract of these flakes is capable of forming gels when dispersed in water. For example, a double or triple extract of flake samples taken at intervals throughout the process of the example was heated. The temperature of heating may vary from 150° F. to boiling and the concentration of solids in the dispersion to be gelled may vary from 10 percent and higher. The extract when employed as a remoistening or heat sealing adhesive produces results comparable to those described and claimed in the copending applications previously referred to.

What is claimed is:

In a method for removing anti-gelling substances from oil-free soybean material containing undenatured soybean protein by extracting said material with an alcohol solvent for such impurities and subsequently separating the residual soybean material from the alcoholic extract, the improvement comprising extracting said material with isopropanol solvent within the range of 50 percent aqueous isopropanol to absolute isopropanol, the ratio of isopropanol solvent being five to one part of solvent for each part of said material, for a period of fifteen minutes to one hour and at a temperature of between room temperature and 85° C., separating the extract containing the anti-gelling substances, cooling the separated extract to a temperature below 20° C. and at least 10° C. below the temperature of extraction to cause partial precipitation of extracted material, separating the precipitated material, permitting the remainder of the extracted materials to remain dissolved in the isopropanol solvent, recycling the said isopropanol solvent containing dissolved materials without further purification to extract more oil-free soybean material, and repeating the said steps of cooling the extract, separating precipitated materials and recycling the isopropanol containing dissolved materials, until an equilibrium is reached in which the built-up solubles are deposited on the solvent-wet soybean material leaving the extraction process at a rate substantially equal to the rate of their removal from the oil-free soybean material in the extraction step, make-up isopropanol being added periodically to compensate for process losses and to replace solvent entrained with the extracted soybean material leaving the extraction step.

PAUL A. BELTER.
ALLAN K. SMITH.
HAROLD J. DEOBALD.
P. A. SINGER.
ELMER F. GURY,
Administrator of the estate of Arthur C. Beckel, deceased.

References Cited in the file of this patent

UNITED STATES PATENTS

| Number | Name | Date |
|---|---|---|
| 2,406,650 | Wormell | Aug. 27, 1946 |
| 2,495,706 | De Voss et al. | Jan. 31, 1950 |